(12) United States Patent
Zhang et al.

(10) Patent No.: US 12,338,937 B2
(45) Date of Patent: Jun. 24, 2025

(54) ROBOT AND PATROL METHOD APPLICABLE TO SYNCHRONOUS PATROL OF LONG BRANCH PIPELINE AND MAIN PIPELINE

(71) Applicant: STATE GRID ANHUI ELECTRIC POWER RESEARCH INSTITUTE, Anhui (CN)

(72) Inventors: Jiaqing Zhang, Anhui (CN); Yi Guo, Anhui (CN); Jia Xie, Anhui (CN); Liufang Wang, Anhui (CN); Taiyun Zhu, Anhui (CN); Jian Sun, Anhui (CN); Shuping Wang, Anhui (CN); Yubiao Huang, Anhui (CN); Yang He, Anhui (CN); Fengju Shang, Anhui (CN); Rui Liu, Anhui (CN); Tiantian Tan, Anhui (CN); Xin Liu, Anhui (CN); Tao Xie, Anhui (CN); Tao Sun, Anhui (CN)

(73) Assignee: State Grid Anhui Electric Power Research Institute, Anhui (CN)

( * ) Notice: Subject to any disclaimer, the term of this patent is extended or adjusted under 35 U.S.C. 154(b) by 0 days.

(21) Appl. No.: 18/865,660

(22) PCT Filed: Jul. 29, 2024

(86) PCT No.: PCT/CN2024/108096
§ 371 (c)(1),
(2) Date: Nov. 13, 2024

(87) PCT Pub. No.: WO2025/031185
PCT Pub. Date: Feb. 13, 2025

(65) Prior Publication Data
US 2025/0164058 A1    May 22, 2025

(30) Foreign Application Priority Data
Aug. 8, 2023 (CN) .......................... 202310988202.0

(51) Int. Cl.
*F16L 55/26* (2006.01)
*B62D 61/12* (2006.01)
(Continued)

(52) U.S. Cl.
CPC ............ *F16L 55/265* (2013.01); *B62D 61/12* (2013.01); *H04N 23/555* (2023.01); *H04N 23/695* (2023.01); *B62D 63/04* (2013.01)

(58) Field of Classification Search
CPC ... F16L 55/265; H04N 23/695; H04N 23/555; B62D 61/12; B62D 63/04
See application file for complete search history.

(56) References Cited

U.S. PATENT DOCUMENTS

2018/0313715 A1 * 11/2018 Cichosz ............... B60B 19/006
2020/0030695 A1    10/2020 Kong et al.
(Continued)

FOREIGN PATENT DOCUMENTS

CN     105035192 A    11/2015
CN     105292281 A    2/2016
(Continued)

OTHER PUBLICATIONS

International search report dated Nov. 15, 2024 from corresponding PCT Application No. PCT/CN2024/108096.

*Primary Examiner* — Kyle Armstrong
(74) *Attorney, Agent, or Firm* — ArentFox Schiff LLP

(57) ABSTRACT

A robot applicable to synchronous patrol of a long branch pipeline and a main pipeline includes a walking apparatus and detection apparatuses located on a top of the walking apparatus, where the detection apparatuses accompany the walking apparatus to patrol the main pipeline. The robot further includes a sub-walking apparatus located at a front end of the walking apparatus, where front wheel obstacle-crossing apparatuses of the walking apparatus are also (Continued)

capable of limiting the sub-walking apparatus while crossing an obstacle in the main pipeline, and when the branch pipeline is encountered, the front wheel obstacle-crossing apparatuses are lifted to a certain height, a bin outlet of the sub-walking apparatus is released, and the sub-walking apparatus is separated from the walking apparatus and independently patrols the branch pipeline.

14 Claims, 7 Drawing Sheets

(51) Int. Cl.
    *H04N 23/50*     (2023.01)
    *H04N 23/695*     (2023.01)
    *B62D 63/04*     (2006.01)

(56) References Cited

U.S. PATENT DOCUMENTS

| | | |
|---|---|---|
| 2020/0306956 A1 | 10/2020 | Kong et al. |
| 2022/0037312 A1 | 11/2022 | Song et al. |
| 2022/0373122 A1 | 11/2022 | Song et al. |
| 2023/0051111 A1* | 2/2023 | Cyrus ................ B60K 7/0007 |

FOREIGN PATENT DOCUMENTS

| | | | |
|---|---|---|---|
| CN | 105480313 A | 4/2016 | |
| CN | 209504096 U | 10/2019 | |
| CN | 110576953 A | 12/2019 | |
| CN | 112171680 A | 1/2021 | |
| CN | 114872063 A | 8/2022 | |
| CN | 217396784 U | 9/2022 | |
| CN | 116697190 A | 9/2023 | |
| DE | 19527316 A1 * | 2/1997 | ............ B62D 63/02 |
| EP | 1502843 A2 * | 2/2005 | ............ B62D 11/00 |
| JP | H08166351 A | 6/1996 | |
| KR | 100726194 B1 | 6/2007 | |
| KR | 20150036888 A | 4/2015 | |
| KR | 102178927 B1 | 11/2020 | |

* cited by examiner

ROBOT AND PATROL METHOD APPLICABLE TO SYNCHRONOUS PATROL OF LONG BRANCH PIPELINE AND MAIN PIPELINE

CROSS-REFERENCE TO RELATED APPLICATIONS

This is a National Stage Application, filed under 35 U.S.C.371 based on International Patent Application No. PCT/CN2024/108096, filed on Jul. 29, 2024, which claims priority to Chinese Patent Application No. 202310988202.0, filed on Aug. 8, 2023, the disclosures of both of which are incorporated herein by reference in their entireties.

TECHNICAL FIELD

The present application relates to the technical field of pipeline patrol, for example, a robot and patrol method applicable to synchronous patrol of a long branch pipeline and a main pipeline.

BACKGROUND

In an accident oil discharge pipeline network of an extra-high voltage converter station, a branch pipeline and a main pipeline have horizontally arranged pipeline sections, and each of the main pipeline and the branch pipeline has a relatively small pipeline diameter. Generally, the main pipeline has a pipeline diameter of 600 mm, and the branch pipeline has a pipeline diameter of 500 mm. A conventional detection robot can only detect an internal condition of the main pipeline and a condition of a position near a connection between the branch pipeline and the main pipeline in a single trip down to a well. For a relatively long branch pipeline, a walking mechanism of the robot cannot directly turn into the branch pipeline for detection and cannot complete the detection work. In an actual environment, some relatively large and relatively high obstacles exist inside the main pipeline. A conventional crawler walking mechanism with a relatively large size and a relatively heavy mass is mostly applicable to large-diameter pipeline detection and does not conform to the patrol of the accident oil discharge pipeline network of the extra-high voltage converter station. A conventional multi-legged walking mechanism has the problems such as an insufficient traction force, a relatively short operation travel and complex motion control and is also not suitable for the patrol of the accident oil discharge pipeline network of the extra-high voltage converter station. A wheeled walking mechanism is compact in structure, simple to control, strong in maneuverability and stable in operation, thereby meeting requirements of the pipeline patrol.

In Patent Publication No. CN110576953A of the related art, a child-mother underwater detection robot system for a large-diameter long water diversion tunnel includes a shore-based control container, a vehicle-mounted winch system, a crawling mother patrol robot and a mobile child detection robot, where the vehicle-mounted winch system is used for laying and recovering a cable, one end of the cable is connected to the crawling mother patrol robot, the other end of the cable is connected to the control container, and the mobile child detection robot is installed on the crawling mother patrol robot. Using an operation mode of the crawling mother patrol robot and the mobile child detection robot can adapt to omni-directional and multi-level detection in a complex environment of the tunnel. However, the crawling mother patrol robot enters a detected pipeline together with the child detection robot. The mother patrol robot is a crawler robot, and the child detection robot can suspend in the water pipeline, which is not applicable to this application scenario.

SUMMARY

The present application provides a robot applicable to synchronous patrol of a long branch pipeline and a main pipeline. The robot includes a walking apparatus (1200) and a detection apparatus (300) located on a top of the walking apparatus (1200), where the detection apparatus (300) is configured to accompany the walking apparatus (1200) to patrol the main pipeline. The robot further includes a sub-walking apparatus (400) located at a front end of the walking apparatus (1200), where a pair of front wheel obstacle-crossing apparatuses (230) of the walking apparatus (1200) are also capable of limiting the sub-walking apparatus (400) while crossing an obstacle in the main pipeline, and when the robot encounters the branch pipeline, the front wheel obstacle-crossing apparatuses (230) are configured to lift to a certain height, and release an outlet of a bin of the sub-walking apparatus (400), and the sub-walking apparatus (400) is configured to be separated from the walking apparatus (1200) and independently patrols the branch pipeline.

In an embodiment of the present application, the walking apparatus (1200) further includes a walking trunk (210) and walking mechanisms (220) disposed symmetrically on two sides of the walking trunk (210), respectively, where the front wheel obstacle-crossing apparatuses (230) are coaxially connected to the walking mechanisms (220), and when the robot encounters a relatively large obstacle, obstacle-crossing wheels (237) of the front wheel obstacle-crossing apparatuses (230) are capable of being lifted to a certain angle, and the walking mechanisms (220) are configured to drive the obstacle-crossing wheels (237) to cross the obstacle.

In an embodiment of the present application, the front wheel obstacle-crossing apparatuses (230) include a swing motor (231), a swing arm gear (232) and a rack (233) that are located in the walking trunk (210) and a concentric shaft (234) coaxially connected to the swing arm gear (232) and passing through a side of the walking trunk (210), and the front wheel obstacle-crossing apparatuses (230) further include an inner shaft sleeve (235) located on an outer side of the walking trunk (210) and coaxially and fixedly connected to the concentric shaft (234), a swing arm housing (236) fixedly connected to the inner shaft sleeve (235) and obstacle-crossing wheels (237) fixedly connected to the swing arm housing (236).

In an embodiment of the present application, the swing motor (231) is configured to transfer power to the swing arm gear (232) and the rack (233) through a screw rod (2311) and a screw nut (2312), and the swing arm gear (232) is meshed with the rack (233) to drive the concentric shaft (234) to rotate and to link the inner shaft sleeve (235) and the swing arm housing (236) to rotate so that the swing arm housing (236) is capable of swinging upward or downward and is capable of driving the obstacle-crossing wheels (237) to move in the same direction.

In an embodiment of the present application, the walking mechanism (220) includes a walking drive motor (221), a concentric outer shaft (222) coaxially connected to the concentric shaft (234), a first synchronization apparatus (223) and driving wheels (224) that are fixed on the concentric outer shaft (222) and driven wheels (225) belt-driven with the driving wheels (224) by the first synchronization apparatus (223), where the walking drive motor (221) drives a transmission bevel gear (2221) located on the concentric outer shaft (222) through a driver bevel gear (2211) on an output end, the transmission bevel gear (2221) is configured to drive the concentric outer shaft (222) to rotate, the concentric outer shaft (222) is configured to synchronously drive the first synchronization apparatus (223) to rotate, and a synchronous belt of the first synchronization apparatus (223) is configured to drive the driving wheels (224) and the driven wheels (225) to rotate synchronously.

In an embodiment of the present application, the walking mechanism (220) further includes a bearing fixing plate (226), a cross roller bearing (227), an outer shaft sleeve (228) and a second synchronization apparatus (229), where the bearing fixing plate (226) is located on the outer side of the walking trunk (210) and is connected to the concentric outer shaft (222), the outer shaft sleeve (228) and an outer ring of the cross roller bearing (227) are fixedly connected to the bearing fixing plate (226) in sequence, the inner shaft sleeve (235) is fixedly connected to an inner ring of the cross roller bearing (227), the second synchronization apparatus (229) is located on the outer shaft sleeve (228) and is located in the swing arm housing (236), a synchronous belt of the second synchronization apparatus (229) is configured to belt-drive the obstacle-crossing wheels (237), and when the concentric outer shaft (222) rotates, the obstacle-crossing wheels (237) are configured to be driven to rotate synchronously with the driving wheels (224) and the driven wheels (225).

In an embodiment of the present application, the sub-walking apparatus (400) includes a sub-machine bin (4130) and a sub-machine (440) located in the sub-machine bin (4130), where the sub-machine bin (4130) is located at a front end of the walking trunk (210) and is located between a pair of front wheel obstacle-crossing apparatuses (230), and the obstacle-crossing wheels (237) are configured to limit two-way outlets of the sub-machine (440) on the sub-machine bin (4130).

In an embodiment of the present application, the sub-machine bin (4130) includes a sub-machine bin seat (410), a sub-machine slide plate (420) and a sub-machine clamp (430), where the sub-machine bin seat (410) is capable of rotating around the walking trunk (210) to adjust an angle of the sub-machine (440) exiting from the bin, the sub-machine slide plate (420) is located inside the sub-machine bin seat (410) and is capable of translationally sliding in the sub-machine bin seat (410), and the sub-machine clamp (430) is configured to clamp or release the sub-machine (440) in a direction perpendicular to the sub-machine slide plate (420) in the sub-machine slide plate (420).

In an embodiment of the present application, the sub-machine (440) includes a sub-machine body (441), a telescopic apparatus (442) located on the sub-machine body (441) and a pan-tilt camera (443) located on a top of the telescopic apparatus (442).

The sub-machine body (441) is capable of advancing or reversing in the branch pipeline, the pan-tilt camera (443) is configured to accompany the sub-machine body (441) to walk and patrol the branch pipeline, the telescopic apparatus (442) is configured to drive the pan-tilt camera (443) to rise or fall, and the pan-tilt camera (443) is capable of axially rotating, radially swinging and detecting at multiple angles on the telescopic apparatus (442).

The present application further provides a patrol method for a robot applicable to synchronous patrol of a long branch pipeline and a main pipeline. The method is applied to the robot applicable to the synchronous patrol of the long branch pipeline and the main pipeline described above and includes the steps described below.

The robot is placed in the main pipeline, the walking apparatus (1200) drives the sub-walking apparatus (400) to walk in the main pipeline, and the detection apparatus (300) detect the main pipeline as the walking apparatus (1200) walks.

When it is determined according to a radar on the robot that the robot arrives at a pipeline port of the next branch pipeline, the obstacle-crossing wheels (237) are lifted to a certain height, and the bin outlet of the sub-walking apparatus (400) is released.

The sub-machine bin seat (410) is rotated to adjust the angle of the sub-machine (440) exiting from the bin according to branch pipelines located at different lateral positions of the main pipeline.

The sub-machine slide plate (420) is translationally slid out of the outlet of the bin of the sub-machine bin seat (410), and when a front end of the sub-machine slide plate (420) in a sliding direction touches an inner wall of the pipeline, continuous slide is stopped.

The sub-machine clamp (430) releases clamping to the sub-machine (440), and the sub-machine (440) drives from the sub-machine slide plate (420) to the branch pipeline in a direction of exiting from the bin for patrol.

After the patrol of the branch pipeline is completed, the sub-machine (440) returns along an original path. When the sub-machine (440) is completely located on the sub-machine slide plate (420), the sub-machine bin seat (410) is rotated to return to an original position, and the sub-machine slide plate (420) drives the sub-machine (440) to slide in an opposite direction.

After the sub-machine (440) returns to the sub-machine bin seat (410), the sub-machine clamp (430) clamps the sub-machine (440), and the obstacle-crossing wheels (237) are placed down to continue to limit the bin outlet of the sub-walking apparatus (400).

The robot continues to walk and patrol in the main pipeline until all branch pipelines are traversed.

DETAILED DESCRIPTION

To facilitate those skilled in the art to understand the technical solutions of the present application, the technical solutions of the present application are further described in conjunction with drawings in the specification.

Terms such as "first" and "second" are used only for the purpose of description and are not to be construed as indicating or implying relative importance or implicitly indicating the number of technical features indicated. Thus, a feature defined as a "first" feature or a "second" feature may explicitly or implicitly include one or more of such features. As used herein, the term "plurality" is defined as two or more, unless otherwise expressly specified and limited.

Figure 1:
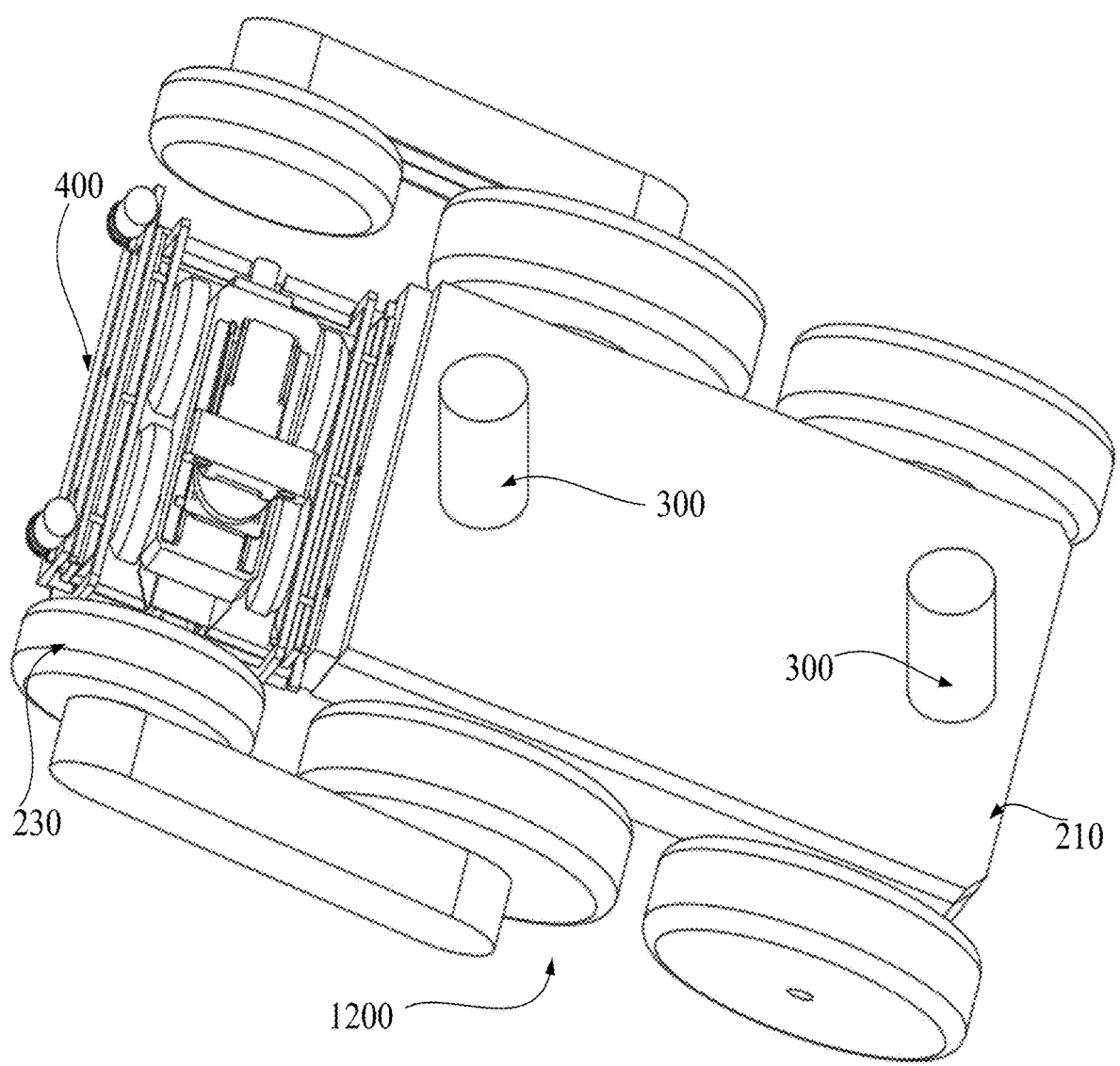
FIG. 1 is a schematic diagram of a robot applicable to synchronous patrol of a long branch pipeline and a main pipeline according to embodiments of the present application.
Figure 2:
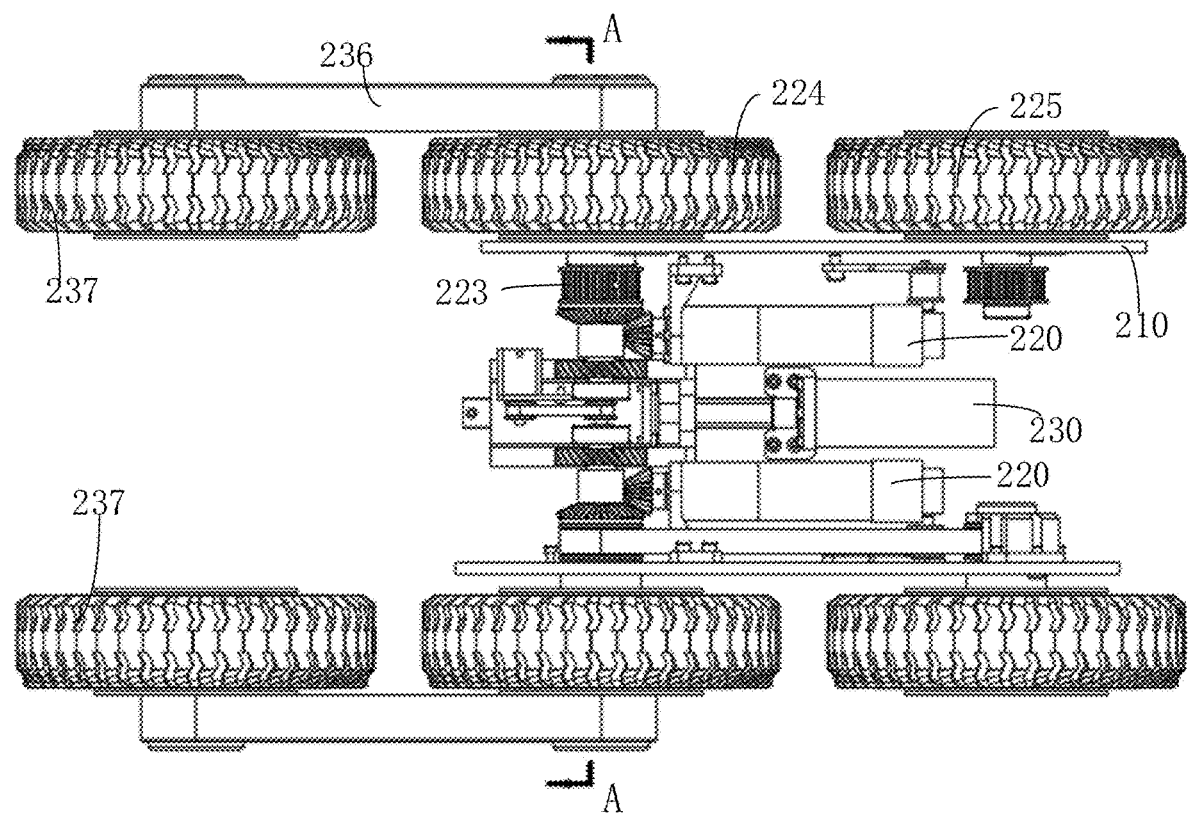
FIG. 2 is a schematic diagram of a walking apparatus according to embodiments of the present application.
Figure 3:
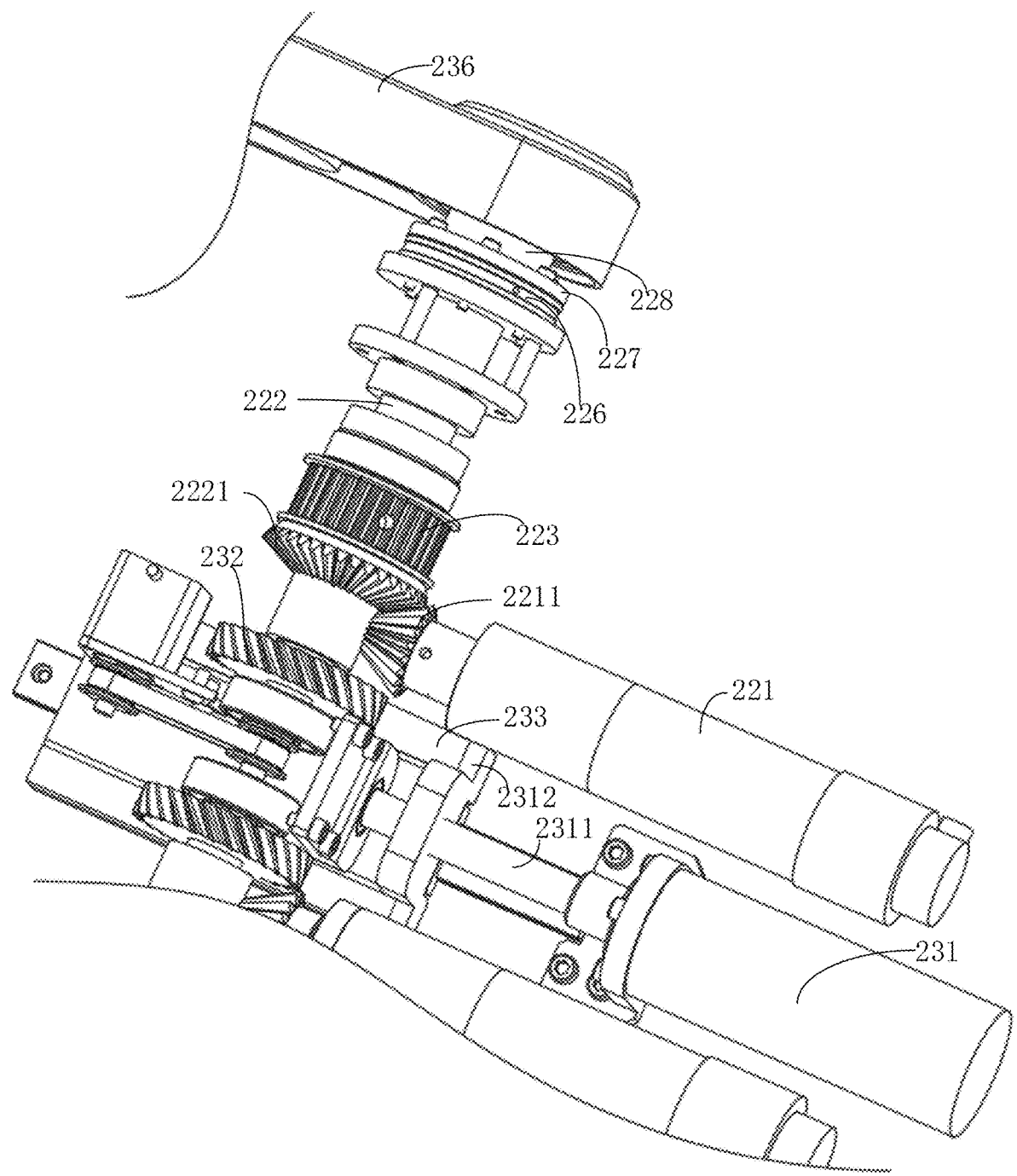
FIG. 3 is a schematic diagram of a walking mechanism and a front wheel obstacle-crossing apparatus according to embodiments of the present application.
Figure 4:
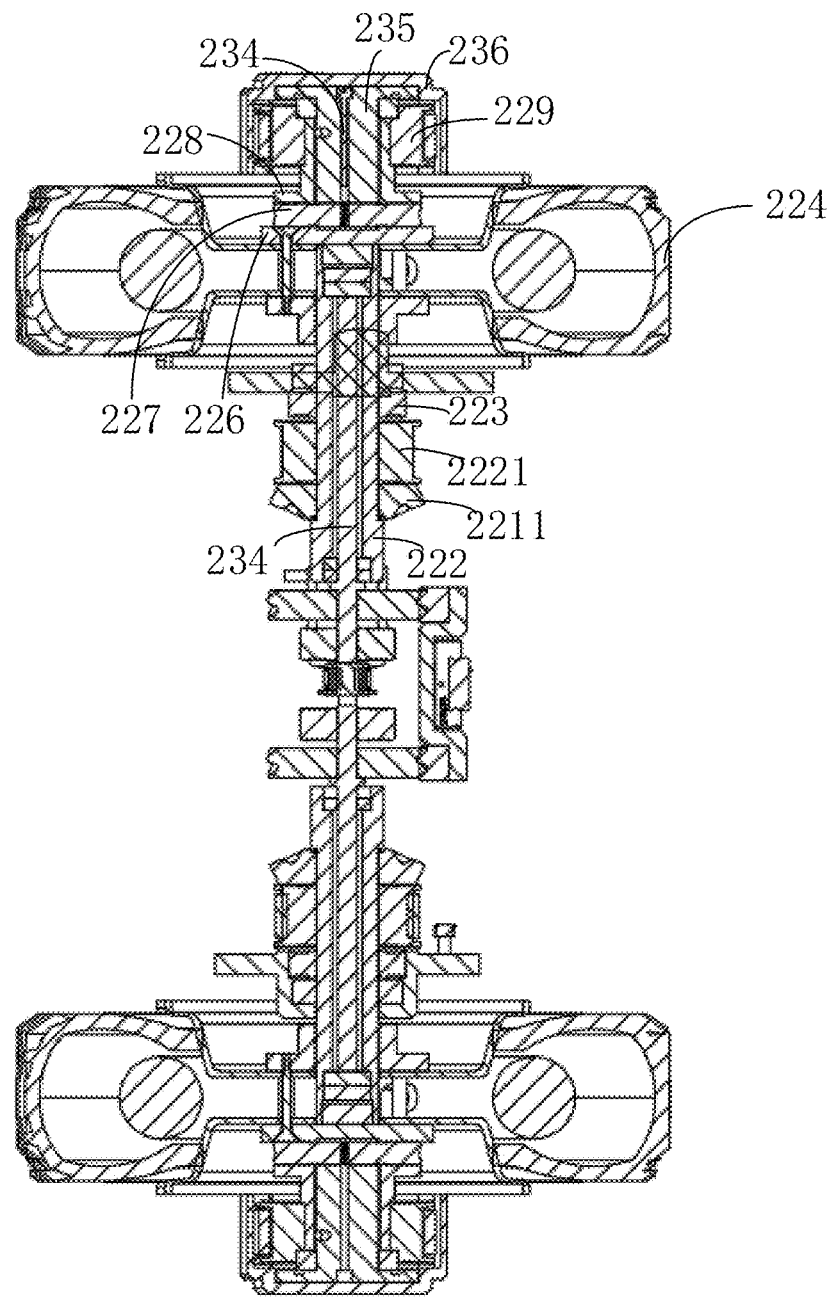
FIG. 4 is a section view of FIG. 2 according to embodiments of the present application along A-A.

Referring to FIG. 1, the present application provides a robot applicable to synchronous patrol of a long branch pipeline and a main pipeline. The robot includes a walking apparatus 1200 and detection apparatuses 300 located on a top of the walking apparatus 1200, where the detection apparatuses 300 accompany the walking apparatus 1200 to patrol the main pipeline. The robot further includes a sub-walking apparatus 400 located at a front end of the walking apparatus 1200, where front wheel obstacle-crossing apparatuses 230 of the walking apparatus 1200 is also capable of limiting the sub-walking apparatus 400 while crossing an obstacle in the main pipeline, and when the branch pipeline is encountered by the robot, the front wheel obstacle-crossing apparatuses 230 are lifted to a preset height, an outlet of a bin of the sub-walking apparatus 400 is released, and the sub-walking apparatus 400 is separated from the walking apparatus 1200 and independently patrols the branch pipeline.

In this embodiment, horizontally disposed main and branch pipelines are parallelly detected by using a child-mother walking apparatus. The walking apparatus detects the main pipeline, and the sub-walking apparatus independently detects the branch pipeline. When a relatively large obstacle is encountered by the robot, obstacle-crossing wheels of the front wheel obstacle-crossing apparatuses are capable of being lifted to a certain angle, and walking mechanisms of the walking apparatus drive the obstacle-crossing wheels to cross the obstacle.

Referring to FIGS. 1 to 4, in an embodiment of the present application, the walking apparatus 1200 includes a walking trunk 210, walking mechanisms 220 disposed symmetrically on two sides of the walking trunk 210, respectively, and front wheel obstacle-crossing apparatuses 230 coaxially connected to the walking mechanisms 220. When a relatively large obstacle is encountered by the robot, the obstacle-crossing wheels 237 of the front wheel obstacle-crossing apparatuses 230 are capable of being lifted to a certain angle, and the walking mechanisms 220 drive the obstacle-crossing wheels 237 to cross the obstacle. The two walking mechanisms 220 drive independently so that the walking apparatus 1200 can advance, reverse and perform pivot steering in the pipeline. This embodiment is described in detail by using one walking mechanism as an example.

Referring to FIGS. 1 to 4, in an embodiment of the present application, the front wheel obstacle-crossing apparatuses 230 include a swing motor 231, a swing arm gear 232 and a rack 233 that are located in the walking trunk 210 and a concentric shaft 234 coaxially connected to the swing arm gear 232 and passing through a side of the walking trunk 210. The front wheel obstacle-crossing apparatuses 230 further include an inner shaft sleeve 235 located on an outer side of the walking trunk 210 and coaxially and fixedly connected to the concentric shaft 234, a swing arm housing 236 fixedly connected to the inner shaft sleeve 235 and obstacle-crossing wheels 237 fixedly connected to the swing arm housing 236. The swing motor 231 transmits power to the swing arm gear 232 and the rack 233 through a screw rod 2311 and a screw nut 2312, and the swing arm gear 232 is meshed with the rack 233 to drive the concentric shaft 234 to rotate and to link the inner shaft sleeve 235 and the swing arm housing 236 to rotate so that the swing arm housing 236 swings upward or downward and drives the obstacle-crossing wheels 237 to move in the same direction.

Referring to FIGS. 1 to 4, in an embodiment of the present application, the walking mechanism 220 includes a walking drive motor 221, a concentric outer shaft 222 coaxially connected to the concentric shaft 234, a first synchronization apparatus 223 and driving wheels 224 that are fixed on the concentric outer shaft 222 and driven wheels 225 belt-driven with the driving wheels 224 by the first synchronization apparatus 223. The walking drive motor 221 drives a transmission bevel gear 2221 located on the concentric outer shaft 222 through a driver bevel gear 2211 on an output end, the transmission bevel gear 2221 drives the concentric outer shaft 222 to rotate, the concentric outer shaft 222 synchronously drives the first synchronization apparatus 223 to rotate, and a synchronous belt of the first synchronization apparatus 223 drives the driving wheels 224 and the driven wheels 225 to rotate synchronously.

Referring to FIGS. 1 to 4, in an embodiment of the present application, the walking mechanism 220 further includes a bearing fixing plate 226, a cross roller bearing 227, an outer shaft sleeve 228 and a second synchronization apparatus 229. The bearing fixing plate 226 is located on the outer side of the walking trunk 210 and is connected to the concentric outer shaft 222. The outer shaft sleeve 228 and an outer ring of the cross roller bearing 227 are fixedly connected to the bearing fixing plate 226 in sequence. The inner shaft sleeve 235 is fixedly connected to an inner ring of the cross roller bearing 227. The second synchronization apparatus 229 is located on the outer shaft sleeve 228 and is located in the swing arm housing 236, a synchronous belt of the second synchronization apparatus 229 belt drives the obstacle-crossing wheels 237, and when the concentric outer shaft 222 rotates, the second synchronization apparatus 229 is driven to rotate, and the synchronous belt of the second synchronization apparatus 229 drives the obstacle-crossing wheels 237 to rotate, that is, the obstacle-crossing wheels 237 rotate synchronously with the driving wheels 224 and the driven wheels 225.

Figure 5:
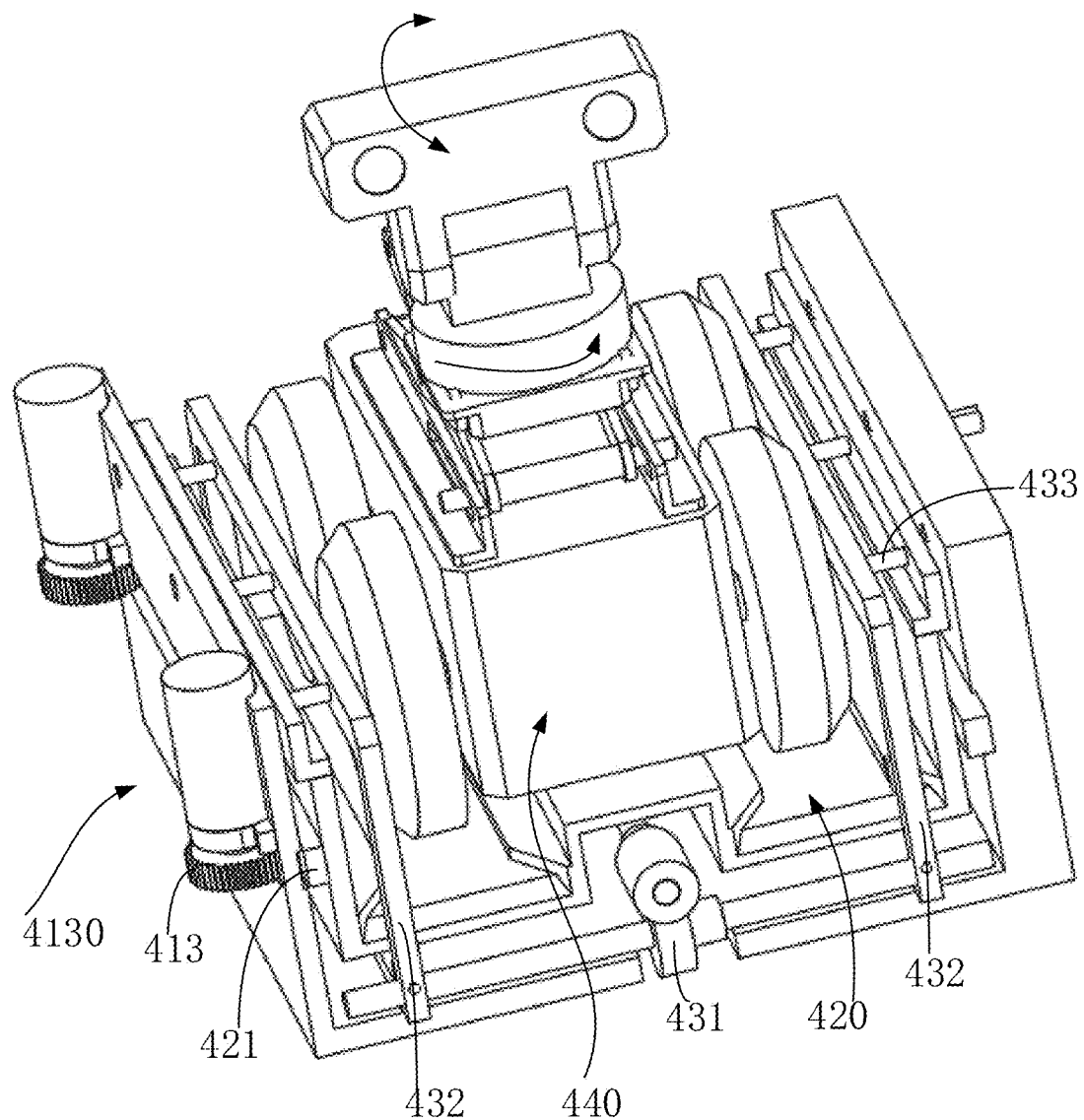
FIG. 5 is a schematic diagram of a sub-walking apparatus according to embodiments of the present application.
Figure 6:
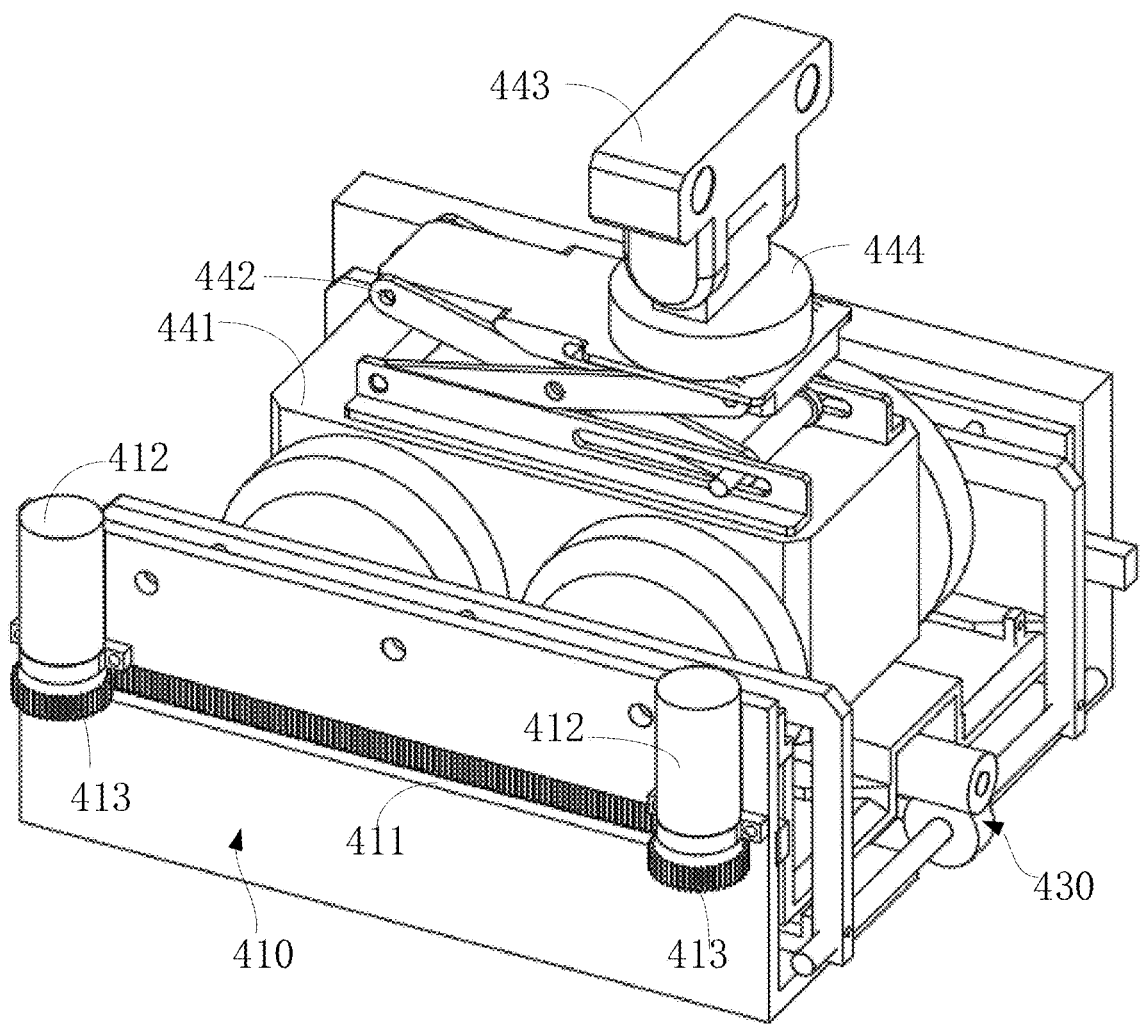
FIG. 6 is a schematic diagram of a sub-walking apparatus at another angle according to embodiments of the present application.

Referring to FIGS. 1, 5 and 6, in an embodiment of the present application, the sub-walking apparatus 400 includes a sub-machine bin 4130 and a sub-machine 440 located in the sub-machine bin 4130. The sub-machine bin 4130 is located at a front end of the walking body 210 and is located between the pair of front wheel obstacle-crossing apparatuses 230, and the obstacle-crossing wheels 237 limit two-way outlets of the sub-machine 440 on the sub-machine bin 4130.

Referring to FIGS. 1, 5 and 6, in an embodiment of the present application, the sub-machine bin 4130 includes a sub-machine bin seat 410, a sub-machine slide plate 420 and a sub-machine clamp 430. The sub-machine bin seat 410 is capable of rotating around the walking trunk 210 to adjust an angle of the sub-machine 440 exiting from the bin. The sub-machine slide plate 420 is located inside the sub-machine bin seat 410 and is capable of translationally sliding in the sub-machine bin seat 410. The sub-machine clamp 430 clamps or releases the sub-machine 440 in a direction perpendicular to the sub-machine slide plate 420 in the sub-machine slide plate 420. A drive motor of the sub-machine bin seat is disposed in the walking trunk 210. An output end of the drive motor of the sub-machine bin seat passes through the front end of the walking trunk 210 and is fixedly connected to one end surface of the sub-machine bin seat 410. The drive motor of the sub-machine bin seat rotates to drive the sub-machine bin seat 410 to rotate to adjust the angle of the sub-machine 440 exiting from the bin. A drive sliding chute 411 is disposed on the other end surface of the sub-machine bin seat 410, sliding motors 412 are disposed at two ends of the drive sliding chute 411, respectively, drive gears 413 are disposed at output ends of the sliding motors 412, and meshing teeth of the drive gears 413 are located in the drive sliding chute 411. The sub-machine slide plate 420 is located in the sub-machine bin seat 410. A sliding rack 421 is disposed on a side surface close to the sliding motors 412 and is meshed with the drive sliding chute 411. When the sliding motors 412 rotate, the drive gears 413 are driven to be meshed with the sliding rack 421 so that the sub-machine slide plate 420 translationally slides in the sub-machine bin seat 410. The sub-machine clamp 430 includes an electric push rod 431 and clamp frames 432 connected to two ends of the electric push rod 431, respectively. The electric push rod 431 is located at a bottom of the sub-machine slide plate 420, and a right-hand thread and a left-hand thread are disposed at the two ends, respectively. When the electric push rod 431 rotates forward or reversely, the clamp frames 432 connected to the two ends of the electric push rod 431, respectively, can move toward or away from each other to clamp or release the sub-machine 440. Multiple slide posts 433 are disposed on a top of the clamp frame 432. One end of the slide post 433 is fixedly connected to the clamp frame 432, and the other end abuts against an inner wall of the sub-machine bin seat 410 after passing through the sub-machine slide plate 420. In addition to connecting the sub-machine slide plate 420 to the sub-machine clamp 430, the slide post 433 also has a certain supporting effect. The electric push rod 431 is connected to the clamp frames 432 at two ends of the bin outlet.

Referring to FIGS. 1, 5 and 6, in an embodiment of the present application, the sub-machine 440 includes a sub-machine body 441, a telescopic apparatus 442 located on the sub-machine body 441 and a pan-tilt camera 443 located on a top of the telescopic apparatus 442. The sub-machine body 441 advances or reverses in the branch pipeline, the pan-tilt camera 443 accompanies the sub-machine body 441 to walk and patrol the branch pipeline, and the telescopic apparatus 442 drives the pan-tilt camera 443 to rise or fall. A rotating table 444 is disposed on the top of the telescopic apparatus 442, and the pan-tilt camera 443 is located on the rotating table 444 so that the pan-tilt camera 443 can axially rotate, radially swing and detect at multiple angles. In this embodiment, the telescopic apparatus 442 is a simple scissor-shaped telescopic frame, and the detection apparatuses 300 are monitoring systems.

Referring to FIGS. 1 to 6, in an embodiment of the present application, a radar (not shown in the figures) is further installed on the walking trunk 210, and a cable connector (not shown in the figures) is further fixed on a tail of the walking trunk 210. The cable connector is fixed on the tail of the walking trunk 210 in manners such as a screw or welding. The cable connector is fixed on one end of a cable, and the other end of the cable is located on a ground and is connected to the control apparatus. The cable and the control apparatus are configured to manipulate an action of the robot, mainly provide a constant internal tensile stress for dragging when the robot advances or returns in the pipeline and control and transmit a signal.

A beneficial effect of the present application is to solve the problem that a conventional detection robot can only detect an internal condition of a main pipeline and a condition of a position near a connection between a branch pipeline and the main pipeline in a single trip down to a well and for a relatively long branch pipeline, a walking mechanism of the robot cannot directly turn into the branch pipeline for detection and cannot complete the detection work. Compared with the case that only one robot matched with a size of a branch pipeline is used for detecting both a main pipeline and the branch pipeline, the reliability of the patrol is ensured, and the timeliness of the patrol is improved. The robot matched with the size of the branch pipeline is easily tripped by large pieces of solid wastes in the pipeline such as a brick, a cement block or a rebar due to a relatively small size when patrolling the main pipeline so that the reliability of the patrol cannot be ensured. Moreover, one robot patrols both the main pipeline and the branch pipeline, and the patrol mileage in a single trip down to a well is relatively short so that the propulsion of the pipeline patrol is relatively slow and the timeliness cannot be ensured.

Figure 7:
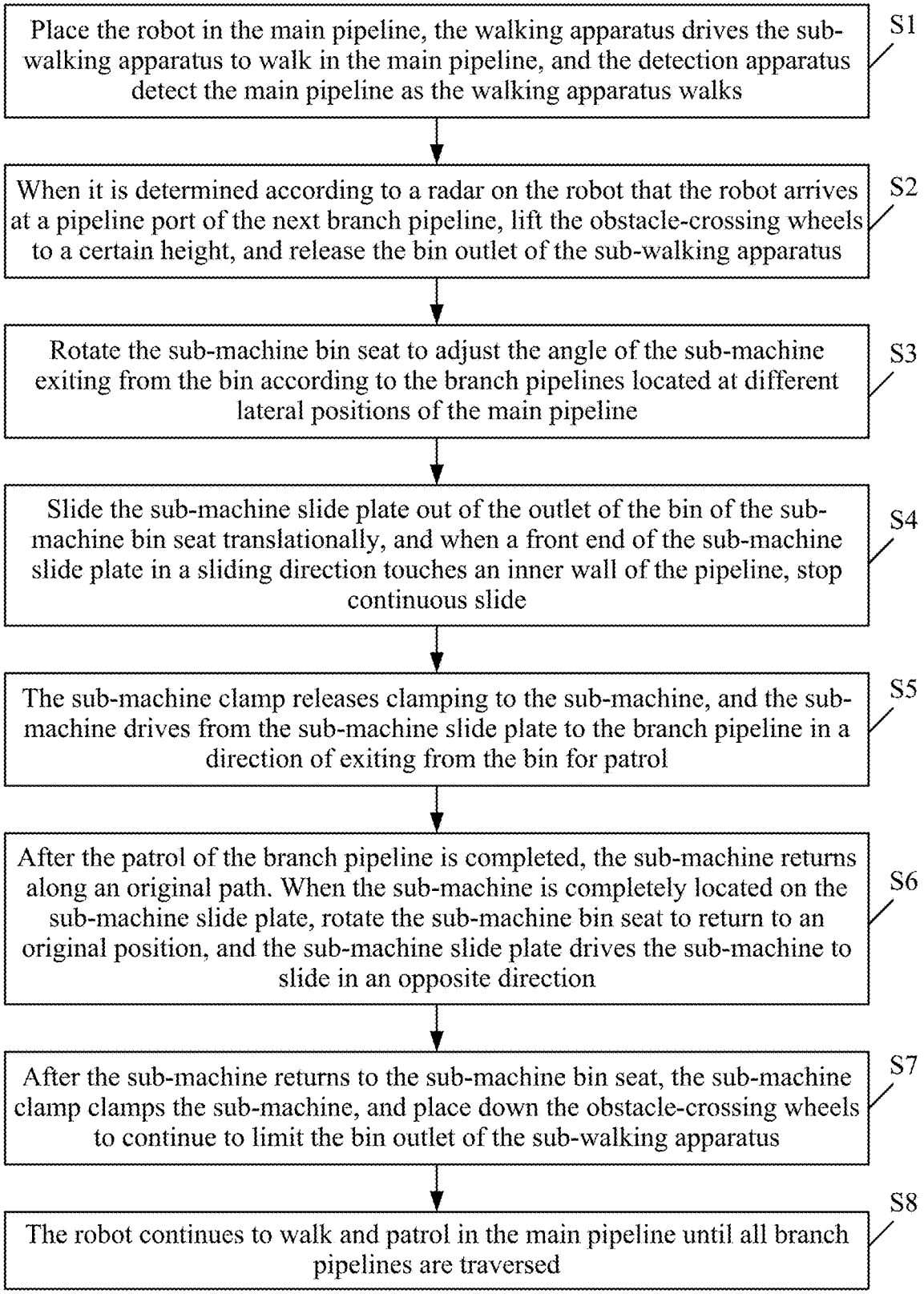
FIG. 7 is a flowchart of a patrol method according to embodiments of the present application.

Referring to FIG. 7, the present application further provides a patrol method for a robot applicable to synchronous patrol of a long branch pipeline and a main pipeline. The method includes the steps described below.

In S1, the robot is placed in the main pipeline, the walking apparatus 1200 drives the sub-walking apparatus 400 to walk in the main pipeline, and the detection apparatuses 300 detect the main pipeline as the walking apparatus 1200 walks.

In S2, when it is determined according to a radar on the robot that the robot arrives at a pipeline port of the next branch pipeline, the obstacle-crossing wheels 237 are lifted to a certain height, and the bin outlet of the sub-walking apparatus 400 is released.

In S3, the sub-machine bin seat 410 is rotated to adjust the angle of the sub-machine 440 exiting from the bin according to branch pipelines located at different lateral positions of the main pipeline.

In S4, the sub-machine slide plate 420 is translationally slid out of the bin outlet of the sub-machine bin seat 410, and when a front end of the sub-machine slide plate 420 in a sliding direction touches an inner wall of the pipeline, continuous slide is stopped.

In S5, the sub-machine clamp 430 releases clamping to the sub-machine 440, and the sub-machine 440 drives from the sub-machine slide plate 420 to the branch pipeline in a direction of exiting from the bin for patrol.

In S6, after the patrol of the branch pipeline is completed, the sub-machine 440 returns along an original path. When the sub-machine 440 is completely located on the sub-machine slide plate 420, the sub-machine bin seat 410 is rotated to return to an original position, and the sub-machine slide plate 420 drives the sub-machine 440 to slide in an opposite direction.

In S7, after the sub-machine 440 returns to the sub-machine bin seat 410, the sub-machine clamp 430 clamps the sub-machine 440, and the obstacle-crossing wheels 237 are placed down to continue to limit the bin outlet of the sub-walking apparatus 400.

In S8, the robot continues to walk and patrol in the main pipeline until all branch pipelines are traversed.

What is claimed is:

1. A robot applicable to synchronous patrol of a long branch pipeline and a main pipeline, comprising:
a walking apparatus;
a detection apparatus, located on a top of the walking apparatus, wherein the detection apparatus is configured to accompany the walking apparatus to patrol the main pipeline; and
a sub-walking apparatus, located at a front end of the walking apparatus;
wherein a pair of front wheel obstacle-crossing apparatuses of the walking apparatus are capable of limiting the sub-walking apparatus while crossing an obstacle in the main pipeline; and when the robot encounters the branch pipeline, the front wheel obstacle-crossing apparatuses are configured to lift to a certain height and release an outlet of a bin of the sub-walking apparatus, and the sub-walking apparatus is configured to be separated from the walking apparatus and independently patrol the branch pipeline;
the sub-walking apparatus comprises a sub-machine bin and a sub-machine located in the sub-machine bin, wherein the sub-machine bin is located at a front end of a walking trunk of the walking apparatus and is located between the pair of front wheel obstacle-crossing apparatuses, and obstacle-crossing wheels of the front wheel obstacle-crossing apparatuses are configured to limit two-way outlets of the sub-machine on the sub-machine bin; and
the sub-machine bin comprises a sub-machine bin seat, a sub-machine slide plate and a sub-machine clamp, wherein the sub-machine bin seat is capable of rotating around the walking trunk to adjust an angle of the sub-machine exiting from the bin, the sub-machine slide plate is located inside the sub-machine bin seat and is capable of translationally sliding in the sub-machine bin seat, and the sub-machine clamp is configured to clamp or release the sub-machine in a direction perpendicular to the sub-machine slide plate in the sub-machine slide plate.

2. The robot according to claim 1, wherein the walking apparatus further comprises walking mechanisms disposed symmetrically on two sides of the walking trunk, respectively;
the front wheel obstacle-crossing apparatuses are coaxially connected to the walking mechanisms; and
when the robot encounters a relatively large obstacle, the obstacle-crossing wheels of the front wheel obstacle-crossing apparatuses are capable of being lifted to a certain angle, and the walking mechanisms is configured to drive the obstacle-crossing wheels to cross the obstacle.

3. The robot according to claim 2, wherein the front wheel obstacle-crossing apparatuses comprise a swing motor, a swing arm gear and a rack that are located in the walking trunk and a concentric shaft coaxially connected to the swing arm gear and passing through a side of the walking trunk; and
the front wheel obstacle-crossing apparatuses further comprise an inner shaft sleeve located on an outer side of the walking trunk and coaxially and fixedly connected to the concentric shaft, a swing arm housing fixedly connected to the inner shaft sleeve and the obstacle-crossing wheels fixedly connected to the swing arm housing.

4. The robot according to claim 3, wherein the swing motor is configured to transfer power to the swing arm gear and the rack through a screw rod and a screw nut, and the swing arm gear is meshed with the rack to drive the concentric shaft to rotate and to link the inner shaft sleeve and the swing arm housing to rotate so that the swing arm housing swings upward or downward and is capable of driving the obstacle-crossing wheels to move in a same direction.

5. The robot according to claim 4, wherein the walking mechanism comprises a walking drive motor, a concentric outer shaft coaxially connected to the concentric shaft, a first synchronization apparatus and driving wheels and driven wheels belt-driven with the driving wheels by the first synchronization apparatus, the first synchronization apparatus and the driving wheels are fixed on the concentric outer shaft; and
the walking drive motor is configured to drive a transmission bevel gear located on the concentric outer shaft through a driver bevel gear on an output end, the transmission bevel gear is configured to drive the concentric outer shaft to rotate, the concentric outer shaft is configured to synchronously drive the first synchronization apparatus to rotate, and a synchronous belt of the first synchronization apparatus is configured to drive the driving wheels and the driven wheels to rotate synchronously.

6. The robot according to claim 5, wherein the walking mechanism further comprises a bearing fixing plate, a cross roller bearing, an outer shaft sleeve and a second synchronization apparatus; and
the bearing fixing plate is located on the outer side of the walking trunk and is connected to the concentric outer shaft;
the outer shaft sleeve and an outer ring of the cross roller bearing are fixedly connected to the bearing fixing plate in sequence;
the inner shaft sleeve is fixedly connected to an inner ring of the cross roller bearing;
the second synchronization apparatus is located on the outer shaft sleeve and is located in the swing arm housing, a synchronous belt of the second synchronization apparatus is configured to belt-drive the obstacle-crossing wheels; and
when the concentric outer shaft rotates, the obstacle-crossing wheels are configured to be driven to rotate synchronously with the driving wheels and the driven wheels.

7. The robot according to claim 1, wherein the sub-machine comprises a sub-machine body, a telescopic apparatus located on the sub-machine body and a pan-tilt camera located on a top of the telescopic apparatus; and
the sub-machine body is capable of advancing or reversing in the branch pipeline;
the pan-tilt camera is configured to accompany the sub-machine body to walk and patrol the branch pipeline; and
the telescopic apparatus is configured to drive the pan-tilt camera to rise or fall, and
the pan-tilt camera is capable of axially rotating, radially swinging and detecting at a plurality of angles on the telescopic apparatus.

8. A patrol method for a robot applicable to synchronous patrol of a long branch pipeline and a main pipeline, being applied to the robot applicable to the synchronous patrol of the long branch pipeline and the main pipeline according to claim 1 and comprising:

placing the robot in the main pipeline;

driving, by the walking apparatus, the sub-walking apparatus to walk in the main pipeline, and detecting, by the detection apparatus, the main pipeline as the walking apparatus walks;

when it is determined according to a radar on the robot that the robot arrives at a pipeline port of a next branch pipeline, lifting the obstacle-crossing wheels to a certain height, and releasing an outlet of a bin of the sub-walking apparatus;

rotating the sub-machine bin seat to adjust the angle of the sub-machine exiting from the bin according to branch pipelines located at different lateral positions of the main pipeline;

translationally sliding the sub-machine slide plate out of the outlet of the bin of the sub-machine bin seat, and when a front end of the sub-machine slide plate in a sliding direction touches an inner wall of the pipeline, stopping continuous slide;

releasing, by the sub-machine clamp, clamping to the sub-machine, and driving, by the sub-machine, from the sub-machine slide plate to the branch pipeline in a direction of exiting from the bin for patrol;

after the patrol of the branch pipeline is completed, returning, by the sub-machine, along an original path;

when the sub-machine is completely located on the sub-machine slide plate, rotating the sub-machine bin seat to return to an original position, and driving, by the sub-machine slide plate, the sub-machine to slide in an opposite direction;

after the sub-machine returns to the sub-machine bin seat, clamping, by the sub-machine clamp, the sub-machine, and placing down the obstacle-crossing wheels to continue to limit the bin outlet of the sub-walking apparatus; and continuing to walk and patrol, by the robot, in the main pipeline until all branch pipelines are traversed.

9. The patrol method of claim 8, being applied to the robot applicable to the synchronous patrol of the long branch pipeline and the main pipeline according to claim 2.

10. The patrol method of claim 8, being applied to the robot applicable to the synchronous patrol of the long branch pipeline and the main pipeline according to claim 3.

11. The patrol method of claim 8, being applied to the robot applicable to the synchronous patrol of the long branch pipeline and the main pipeline according to claim 4.

12. The patrol method of claim 8, being applied to the robot applicable to the synchronous patrol of the long branch pipeline and the main pipeline according to claim 5.

13. The patrol method of claim 8, being applied to the robot applicable to the synchronous patrol of the long branch pipeline and the main pipeline according to claim 6.

14. The patrol method of claim 8, being applied to the robot applicable to the synchronous patrol of the long branch pipeline and the main pipeline according to claim 7.

* * * * *